United States Patent

Imamiya et al.

Patent Number: 5,505,243
Date of Patent: Apr. 9, 1996

[54] PNEUMATIC RADIAL TIRE WITH 1X2 STEEL BELT CORD

[75] Inventors: Susumu Imamiya; Hisao Katoh; Yukio Tozawa, all of Hiratsuka, Japan

[73] Assignee: The Yokohama Rubber Co., Ltd., Japan

[21] Appl. No.: 323,711

[22] Filed: Oct. 18, 1994

Related U.S. Application Data

[63] Continuation of Ser. No. 825,807, Jan. 21, 1992, abandoned, which is a continuation of Ser. No. 484,841, Feb. 26, 1990, abandoned.

[30] Foreign Application Priority Data

Feb. 27, 1989 [JP] Japan ................................. 1-43205

[51] Int. Cl.⁶ .............................. B60C 9/18; B60C 9/20
[52] U.S. Cl. ......................... 152/527; 57/902; 152/451
[58] Field of Search ...................... 152/451, 527; 57/902

[56] References Cited

U.S. PATENT DOCUMENTS

| | | | |
|---|---|---|---|
| 4,235,274 | 11/1980 | Suzuki et al. | 152/527 |
| 4,333,306 | 6/1982 | Yamashita et al. | 152/451 X |
| 4,506,500 | 3/1985 | Miyauchi | 57/902 |
| 4,644,989 | 2/1987 | Charvet | 152/527 |
| 4,715,419 | 12/1987 | Kawasaki et al. | 152/527 |
| 4,738,096 | 4/1988 | Hatakeyama et al. | 152/527 X |
| 4,749,017 | 6/1988 | Loesch | 152/527 |
| 4,836,262 | 6/1989 | Nishizawa et al. | 152/527 |
| 5,213,652 | 5/1993 | Katoh et al. | 152/451 |
| 5,287,691 | 2/1994 | Okamoto et al. | 57/902 X |
| 5,293,737 | 3/1994 | Kobayashi et al. | 57/902 X |

FOREIGN PATENT DOCUMENTS

| | | |
|---|---|---|
| 62-117893 | 5/1987 | Japan. |
| 62-234921 | 10/1987 | Japan. |

*Primary Examiner*—Adrienne C. Johnstone
*Attorney, Agent, or Firm*—Finnegan, Henderson, Farabow, Garrett & Dunner

[57] ABSTRACT

A pneumatic radial tire for passenger cars and heavy duty use is disclosed, which tire has a rubber coated steel cord layer in its belt portion. The cord consists of a pair of steel filaments whose preform ratio "K" is set in the range of $2.05{-}K_1 \leq K_2 < 2.50{-}K_1$. Conformance to this preform ratio "K" provides filaments with periodically alternate contact and non-contact regions longitudinally of the cord.

2 Claims, 1 Drawing Sheet

PNEUMATIC RADIAL TIRE WITH 1X2 STEEL BELT CORD

This application is a continuation of application Ser. No. 07/825,807, filed Jan. 21, 1992, now abandoned, which is a continuation of application Ser. No. 07/484,841, filed Feb. 26, 1990, now abandoned.

BACKGROUND OF THE INVENTION

1. Field of the Invention

This invention relates to pneumatic radial-ply tires for motor vehicles, more particularly to a steel cord reinforcement therefor.

2. Prior Art

Advanced pneumatic radial-ply tires for passenger cars as well as heavy-duty automotive vehicles are provided typically with belt layers made up of rubber coated steel cords. Organic fiber cords such as aramid cords have also found wide application for the belts of the radial tire, but have mostly been accompanied with the use of rubber coated steel cords at least for one belt layer to provide increased rigidity.

While steel cords are suitable for use as a belt reinforcement material in view of their high rigidity and strength, the cords being made of steel are susceptible to corrosion attack by water or moisture permeating through an external injury on the tire which would lead to separation from a rubber coating surrounding the cords and thus pose a durability problem. To solve this problem, there has been proposed a so-called rubber penetrated steel cord having two filaments in the tire core and a strand construction of 2+7, 2+6 and so on having increased filament-to-filament spacing in the outer sheath of the tire. However, such cords literally require so many steel wires that the belt portion of the tire becomes objectionably thick and this is economically disadvantageous. Cords with less filaments such as of a 2+2 strand were also proposed and put to use. Even simpler cord structures having a 1×2 strand are also known as disclosed for instance in Japanese Laid-Open Patent Publication Nos. 62-117893 and 62-234921. These cords however are not quite satisfactory in terms of durability as they are also prone to being corroded by water permeation through the belt layers to which the cords are applied.

SUMMARY OF THE INVENTION

With the foregoing problems associated with the prior art, research efforts have been made to arrive at the present invention based on the following findings.

(1) Filaments of a 1×2 cord contacted with each other continuously over their entire lengths are liable to relative displacement during use of the tire which would result in small pores or voids formed in proximity to the contact areas.

(2) The above voids are quite small compared to those formed in closed-twist cords but large enough to receive water particles or water vapor.

(3) The rate of speed of water permeation through the voids in a 1×2 cord is much greater than that of dispersive permeation of water from the tire surfaces.

(4) It is therefore believed effective to intercept the continuity of contact between the two filaments.

(5) Since it is impractical to totally eliminate contact between two filaments longitudinally of the cord, it would be a more practical approach to provide periodically alternate contact and non-contact areas throughout the length of the cord.

(6) This approach can be implemented by varying a preform ratio of the two filaments.

It is therefore a primary object of the present invention to provide a pneumatic radial tire having such a steel cord reinforcement which is immune to corrosive damage which would otherwise result from contact with water permeating through the cuts in the tread of the tire.

A more specific object of the invention resides in the provision of a pneumatic radial tire having rubber coated steel cords of a 1×2 strand construction in the belt portion of the tire and which is devised to preclude permeation of water or moisture directed longitudinally of the cord, thereby contributing to prolonged service life of the tire.

The above and other objects and features will become apparent from the following description taken with reference to the accompanying drawings.

According to the invention, there is provided a pneumatic radial tire for motor vehicles which comprises at least one rubber coated steel cord layer in a belt portion of the tire, the steel cord consisting of a pair of steel filaments, each of which filaments has a preform ratio "K" in the range of $2.05 - K_1 \leq K_2 < 2.50 - K_1$.

DETAILED DESCRIPTION OF THE INVENTION

Figure 2:
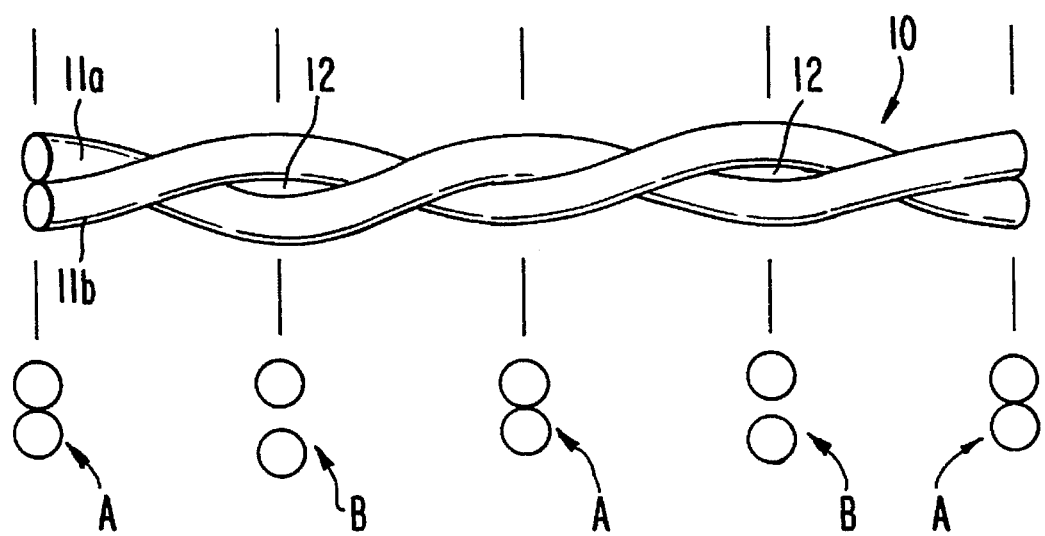
FIG. 2 is a diagrammatic side view of a 1×2 cord designed to exaggeratively illustrate the alternate distribution of contact and non-contact regions of the cord.

A radial tire according to the invention is useful for use on passenger cars and heavy duty automotive equipment as well. The tire incorporates a rubber coated steel cord 10 consisting of two intertwisted filaments 11a and 11b, as shown in FIG. 2, for providing reinforcement of the belt layer or layers of the tire. In the case where a plurality of belt layers per tire are present, all of them may be formed of a rubber coated steel cord layer or may include other layer materials such as for example aramid fiber cord layer.

The steel cord 10 of the invention has a 1×2 strand construction whose filaments 11a and 11b each have a preform ratio "K" in the range of $$2.05 - K_1 \leq K_2 < 2.50 - K_1$$

Figure 1:
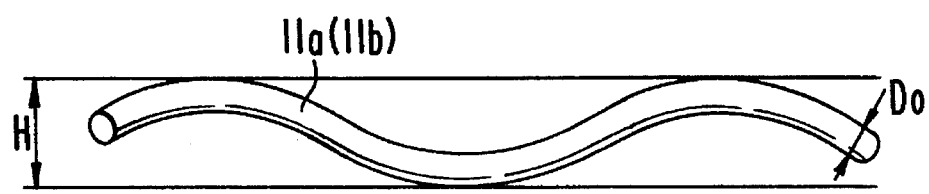
FIG. 1 is a diagrammatic side view of a steel wire filament designed to illustrate a preform ratio "K" for the filament.

The term preform ratio "K" used herein is defined by "K"=H/2Do where H is the amplitude of the performed filament 11a, (11b) and Do is the diameter of the filament 11a, (11b) as illustrated in FIG. 1.

The two filaments 11a and 11b may have the same or different preform ratio "K" as long as this parameter remains in the above specified range.

Durability test of the belt portion of the tire have been conducted by varying the preform ratio "K". It has been found that when the two filaments 11a and 11b are twisted and formed in accordance with the specified preform ratio "K", there are present contact regions A periodically alternating with non-contact regions B as shown in FIG. 2 and that this is conducive to reduction to an absolute minimum of degradation of the cord 10 by water permeation into the belt portion of the tire. Experiments further revealed that a cord with its filament preform ratio set at $K_2 > K_1 + 2.50$ is satisfactory in terms of penetration of the rubbery material through the cord during tire manufacture and can prevent water permeation from outside the tire, but the resulting cord ends up with its diameter irregularly distributed as longitudinally measured and hence is subjected to localized strains developed during the running of the tire, eventually leading to filament breakage, and further that such tires when manufactured have considerable dimensional irregularities.

When producing steel wire filaments $11a$ and $11b$ having a preform ratio "$K_1$" and a preform ratio "$K_2$" respectively, this may be done by adjusting the set positions of the preforming pins so as to control the extent to which the respective filaments are preformed prior to twisting.

The two filaments $11a$ and $11b$ are intertwisted with the sum of the preform ratios $K_1+K_2$ being in the range of $2.05 \leq K_1+K_2 < 2.50$ whereby they develop mutual contact regions A periodically alternating with non-contact regions B with voids 12 filled up with the rubbery material, as shown in FIG. 2. The twist lay length, or the twist pitch of the respective filaments, though not specifically limited, may be preferably in the range of 8 mm–16 mm.

EXAMPLE

Eight different pneumatic radial tires Nos. 1–8 each of size 195/70 R14 having steel corded belt layers with a twist pitch of 14 mm were mounted on a test car and were inflated to an air pressure of 2 kg/cm$^2$. The car was run on a paved road for a total travel distance of 60,000 kilometers. Each tire had been initially provided with a hole in the tread at two different places reaching the belt layers so as to facilitate permeation of water into the tire on travel. The belt layers were checked for failures with the results listed in the Table in which rubber penetration in the steel cords is represented in percentage by the ratio of the length of filament-to-filament spacing to the length of filaments completely covered with rubber. The length of the cord rusted was measured from the tip end of each hole.

Tire No. 1 (control) had a 1×2 cord with its filament preform ratio "K" set at 1.00. Rubber penetration was poor at 5%. Cord breakage occurred and rust grew to 20 mm length.

Tire No. 2 (control) had a "K" value of 0.95 and its test results were substantially the same as Tire No. 1.

Tire No. 3 embodying the invention had a 1×2 cord with a "K" value of 1.05 for each of the two filaments. Rubber penetration was satisfactory, no cord breakage, and rust only 5 mm long.

Tire No. 4 of the invention had a 1×2 cord with a "K" value of 1.00 for one filament and a "K" value of 1.10 for the other. Test results were satisfactory in all respects.

Tire No. 5 of the invention had a 1×2 cord with a "K" value of 0.90 for one filament and a "K" value of 1.20 for the other.

Tire No. 6 (control) had a 1×2 cord with a "K" value of 1.30 for each of the two filaments. Test results on rubber penetration and rust were satisfactory, but cord breakage occurred.

Tire No. 7 (control) had a 1×2 cord with a "K" value of 1.20 for one filament and a "K" value of 1.40 for the other. Test results were the same as Tire No. 6.

Tire No. 8 (control) had a 1×2 cord with a "K" value of 1.00 for one filament and a "K" value of 1.50 for the other. Test results were the same as tire Nos. 6 and 7.

Obviously, various modifications and variations of the present invention are possible in the light of the above teaching. It is therefore to be understood that within the scope of the appended claims the invention may be practiced otherwise than as specifically described.

TABLE

| | Tire No. | | | | | | | |
| --- | --- | --- | --- | --- | --- | --- | --- | --- |
| | 1 | 2 | 3 | 4 | 5 | 6 | 7 | 8 |
| Cord | 1 × 2 × 0.30 | 1 × 2 × 0.30 | 1 × 2 × 0.30 | 1 × 2 × 0.30 | 1 × 2 × 0.30 | 1 × 2 × 0.30 | 1 × 2 × 0.30 | 1 × 2 × 0.30 |
| Twist pitch | 14.0 | 14.0 | 14.0 | 14.0 | 14.0 | 14.0 | 14.0 | 14.0 |
| $K_1$ | 1.00 | 0.95 | 1.05 | 1.00 | 0.90 | 1.30 | 1.20 | 1.00 |
| $K_2$ | 1.00 | 0.95 | 1.05 | 1.10 | 1.20 | 1.30 | 1.40 | 1.50 |
| Rubber penetration | 5 | 5 | 90 | 95 | 95 | 95 | 95 | 95 |
| Cord breakage | yes | yes | no | no | no | yes | yes | yes |
| Rust length | 20 | 20 | 5 | 3 | 3 | 3 | 3 | 3 |

Note:
Tire Nos. 3, 4 and 5 are products of the invention.
Tire Nos. 1, 2, 6, 7 and 8 are controls.

What is claimed is:

1. In a pneumatic radial tire for a motor vehicle having at least one rubber coated steel cord providing reinforcement for a belt layer thereof, the improvement comprising forming said steel cord of a pair of intercrossed steel filaments, said filaments being intertwisted with a twist pitch in the range of 8–16 mm and with contact regions between the 2 filaments periodically alternating with noncontact regions along the length of said cord, each of said filaments being performed prior to twisting to a preform ratio $K=H/2Do$ where H is the amplitude of the preformed filament and Do its diameter, wherein the sum of the ratios $K_1$ and $K_2$, respectively, of the two filaments making up the pair of filaments falls within the range of $2.05 \leq K_1+K_2 < 2.50$, and wherein $K_1$ is not equal to $K_2$.

2. The pneumatic radial tire of claim 1, wherein the values of the preform ratios $K_1$ and $K_2$ are each from 0.90 to 1.20.

* * * * *